US006757949B2

(12) United States Patent
Fitzgerald et al.

(10) Patent No.: US 6,757,949 B2
(45) Date of Patent: Jul. 6, 2004

(54) COMBINATION GEAR HOBBER, CHAMFER/DEBUR AND SHAVER APPARATUS AND METHOD

(75) Inventors: Brian M. Fitzgerald, Cazenovia, NY (US); Jeffrey A. Rynders, Courtland, NY (US)

(73) Assignee: New Venture Gear, Inc., Troy, MI (US)

(*) Notice: Subject to any disclaimer, the term of this patent is extended or adjusted under 35 U.S.C. 154(b) by 0 days.

(21) Appl. No.: 10/339,514

(22) Filed: Jan. 9, 2003

(65) Prior Publication Data

US 2003/0210964 A1 Nov. 13, 2003

Related U.S. Application Data

(60) Provisional application No. 60/367,795, filed on Mar. 27, 2002.

(51) Int. Cl.[7] .............................. B23P 15/14; B23F 17/00
(52) U.S. Cl. .............................. 29/56.5; 409/40; 409/55; 409/11; 409/12; 409/37; 409/49; 409/51; 407/20; 407/23; 407/27; 407/29; 451/900
(58) Field of Search .............................. 409/55, 40, 1, 409/2, 4, 8, 11, 12, 13, 17, 22, 23, 31, 33–35, 37, 49, 38, 50, 51; 407/20, 23, 25, 27, 29; 29/56.5, 566; 451/47, 147, 253, 900

(56) References Cited

U.S. PATENT DOCUMENTS

| | | | | |
|---|---|---|---|---|
| 3,188,915 A | * | 6/1965 | Hurth | 409/11 |
| 3,812,759 A | * | 5/1974 | Wildhaber | 409/40 |
| 4,370,080 A | | 1/1983 | Goode | |
| 4,412,765 A | | 11/1983 | Occhialini | |
| 4,565,474 A | | 1/1986 | Charles | |
| 4,961,289 A | * | 10/1990 | Sulzer | 451/253 |
| 4,981,402 A | | 1/1991 | Krenzer et al. | |
| 5,379,554 A | * | 1/1995 | Thurman et al. | 451/47 |
| 6,575,812 B2 | * | 6/2003 | Wirz | 451/147 |
| 2001/0022098 A1 | * | 9/2001 | Wirz | 409/81 |

FOREIGN PATENT DOCUMENTS

JP 61-30321 A * 2/1986

* cited by examiner

*Primary Examiner*—Erica Cadugan
(74) *Attorney, Agent, or Firm*—Harness, Dickey & Pierce P.L.C.

(57) ABSTRACT

An apparatus is provided for manufacturing a gear component. The apparatus includes a plurality of tooling stocks movable relative to a base. The tooling stocks function to retain a component, as well as operably driving a combination hob/shaver tool and a combination chamfer/debur tool. The apparatus reduces the number of machines required to complete the gear component as well as reducing the cycle time for complete component manufacture. In this way, a more efficient manufacturing system is provided, whereby capital investment and operational costs are reduced.

12 Claims, 3 Drawing Sheets

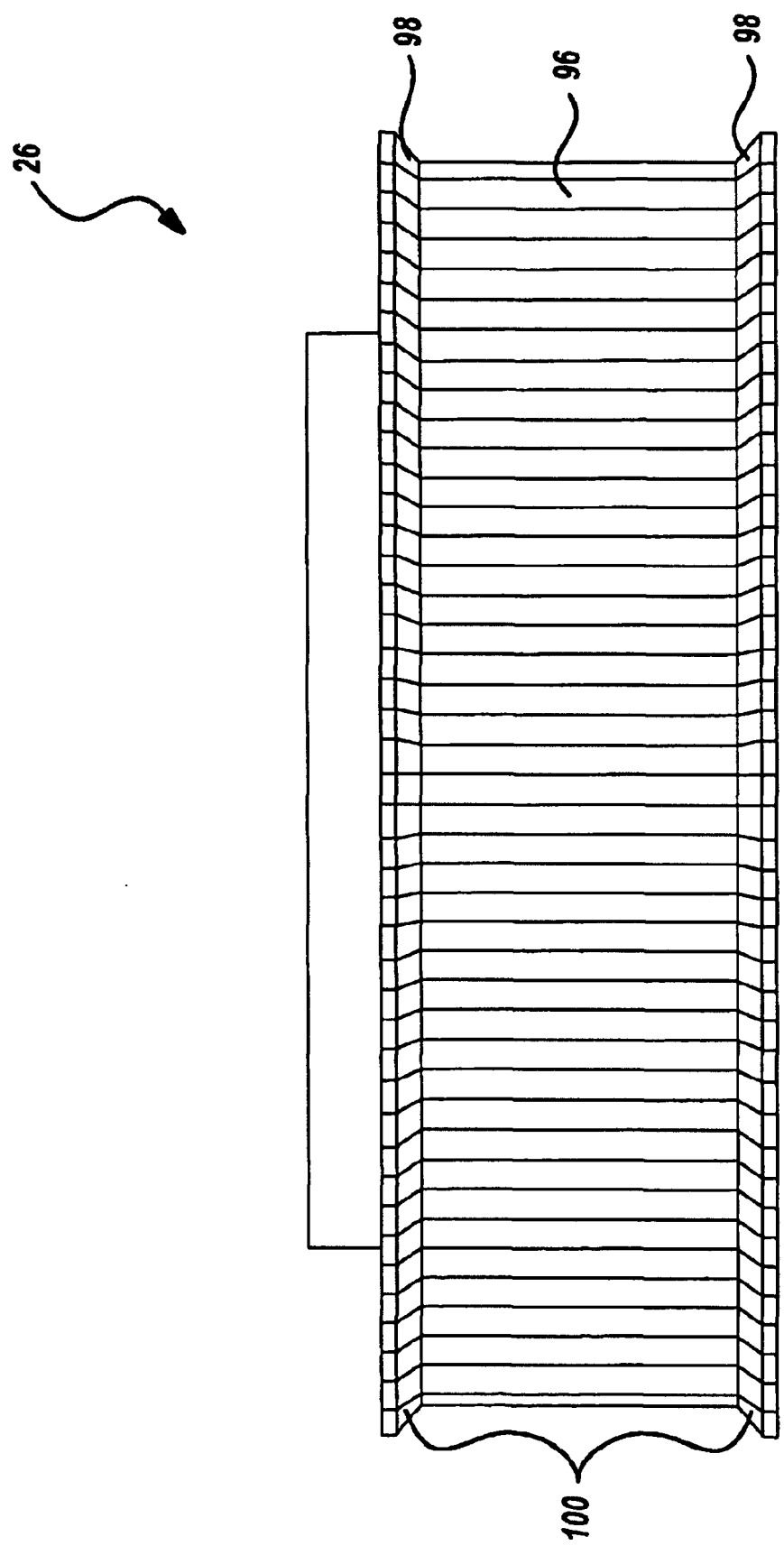

COMBINATION GEAR HOBBER, CHAMFER/DEBUR AND SHAVER APPARATUS AND METHOD

CROSS-REFERENCE TO RELATED APPLICATIONS

This application claims the benefit of U.S. Provisional Application No. 60/367,795, filed on Mar. 27, 2002. The disclosure of the above application is incorporated herein by reference.

FIELD OF THE INVENTION

The present invention generally relates to component manufacture methods, machinery and tooling and more particularly to an improved gear manufacture method, tooling and machinery.

BACKGROUND OF THE INVENTION

Mass production of components, such as gears and the like, typically includes a series of machines integrally linked in a production line. Such machines may include cutters, grinders, shavers, heat treat and the like. Generally, a raw component is loaded at the beginning of the line and each machine performs a specific manufacturing process on the raw component, ultimately producing a finished product. Each step of the process includes an associated cycle-time. The cycle-time is the amount of time it takes a particular machine to perform its process, including loading and unloading of a component. The cycle-time translates directly into manufacturing costs and thus component price.

In addition to cycle-times, each machine has associated costs. The initial cost is the capital investment required to purchase the machine. Other costs are incurred throughout the life of the machine. These on-going costs include maintenance, replacement parts, general running costs (electricity, lubricant, etc.) and the like.

Gear hobbing is one of a variety of methods employed for manufacturing gears and is generally used in mass production for rough cutting teeth in gear blanks. In gear hobbing, the cutting tool is termed a "hob". Generally, hobs are cylindrical in shape and are greater in length than in diameter. The cutting teeth of a hob extend radially from the cylindrical body and follow a helical path about the hob, along the length of the hob. Hobbing is a continuous process in which the hob and gear blank rotate in timed relation to one another. The cutting action is continuous in one direction until the gear is complete.

The hob is fed across the circumferential face of a gear blank at a uniform rate. As the hob moves across the circumferential face of the gear blank, both the hob and the gear blank rotate about their respective axes. As the hob cuts the gear blank, tooth profiles gradually form within the circumferential face of the blank and the teeth gradually take shape across the gear face.

Accuracy and production requirements dictate the type of hob to be used. Hob types vary from single-thread to double-thread or more in multiple. A single-thread hob makes one revolution as the gear being cut rotates the angular distance of one tooth and one space. For example, for producing a spur gear having 49 teeth, a single-thread hob rotates 49 times for one revolution of the gear blank. Similarly, when using a double-thread hob, the hob rotates 49 times for two revolutions of the gear blank. Multiple threads increase the rotational speed of the gear blank accordingly. However, certain limitations are inherent in using multiple-thread hobs.

The number of threads is a function of the intended purpose. Although not efficient for mass production, single-thread hobs may be used for both roughing and finishing. Multiple-thread hobs are commonly used for roughing. As a result of the multiplication effect of multiple-thread hobs, speed increases, thus providing savings in cycle-time. However, compared to single-thread hobs, multiple-thread hobs leave much larger feed marks on the tooth profiles of the gear teeth. For example, using a single-thread hob, each tooth of the hob cuts every tooth space in the gear blank. A double-thread hob contacts every other tooth space during any single revolution of the gear blank.

Various feed directions of the hob, relative to the gear blank, are employable and are dependent upon the type of gear to be cut. The hob feed directions include axial, oblique, infeed (or plunge) and tangential. Generally, the hob is fed into contact with the gear blank as opposed to the gear blank being fed into contact with the hob. Axial hob feeding includes the hob being fed into the gear blank along a path that is parallel to the axis of rotation of the gear blank. In oblique hobbing, the hob path is at an angle relative to the axis of rotation of the gear blank. In this manner, the cutting action is distributed along an increased length of the hob as it is fed across the gear blank. In infeed hobbing, the hob is fed radially inward into the gear blank. With tangential hobbing, the hob is fed tangentially across the gear blank.

Besides rough forming of gear teeth, other forming processes may be required for a particular gear design. For example, typical gear designs dictate that a chamfer be formed on each side of the individual gear teeth. To achieve this, a second roughing process is required using additional tools and machines. Generally, a chamfering tool is used and includes a circumferential face having a set of mating gear teeth recessed between chamfer forming faces. The rough gear and tool are pressed into engagement with one another, wherein the rough gear blank meshes with the mating gear teeth of the chamfering tool and both the tool and the rough gear rotate in unison. As the rough gear and chamfering tool rotate, the chamfer forming faces displace material at each side of the individual gear teeth, thus forming a chamfer on each side of the individual gear teeth.

Having thus formed the chamfers, the displaced material must be removed from the rough gear in a process known as deburring. Deburring of the rough gear is typically achieved using a third process that implements a third tool for cutting away the displaced material. It is, however, known in the art to combine the chamfer forming and deburring tools. A single chamfer/debur tool is constructed similarly as described above for the chamfer tool, however, further includes cutters associated with the chamfer forming faces. The cutters remove the displaced material immediately after the corresponding forming face forms the chamfer.

To finish the gear, a finishing process is performed. Gear finishing processes are used for improving accuracy and uniformity of the gear teeth. The degree of accuracy, and thus the finishing process, required is dependent upon the functional requirements of the gear.

Gear shaving is the most commonly used method of finishing gear teeth prior to hardening. Gear shaving is a cutting process, whereby material is removed from the profiles of each gear tooth by a cutter. The cutter may vary in form, typically resembling a gear or rack depending upon whether a rotary or a rack gear shaving method is used.

Typical gear production lines include a series of machines for performing each of the above-described processes. As such, each machine requires an initial capital investment cost and the other associated costs described above. Furthermore, general production cycle-time of a production line, having multiple machines, includes transfer time between machines. Key elements of manufacturing costs include, but are not limited to, the number of machines required, the number of processes required, the set-up time between the processes and the overall cycle-time of each work-piece. As manufacturers seek to improve overall operational costs reduction in any one of these areas is sought. Manufacturers seek to reduce the amount of machines required for production, thereby reducing capital and maintenance costs, as well as reducing the cycle-time for producing each component, thus increasing the efficiency of the complete process.

A majority of state-of-the-art machine tools are computer numerically controlled machines or "CNC" machines. Such machines use computer control for both machine operation and set-up. Computers further enable a series of machines that perform separate functions to work in concert to perform several operations on a work piece and to mass produce final products. Each machine, however, must be independently programmed by an operator prior to processing a new work piece design. Because each machine is independently programmed, set-up time and thus, overall manufacture time is less efficient than desired. As a result, overall manufacture cost and product cost is higher than desired.

Therefore, it is desirable in the industry to provide improved machinery for producing components, such as gears. The improved machinery should limit the need for additional, supporting machines, reduce the overall capital investment and maintenance costs, as well as reduce the cycle time of component manufacture.

BRIEF DESCRIPTION OF THE DRAWINGS

FIG. 3 is a plan view of a combination chamber/debur tool of the gear manufacturing apparatus of FIG. 1.

DETAILED DESCRIPTION OF THE PREFERRED EMBODIMENT

Figure 1:
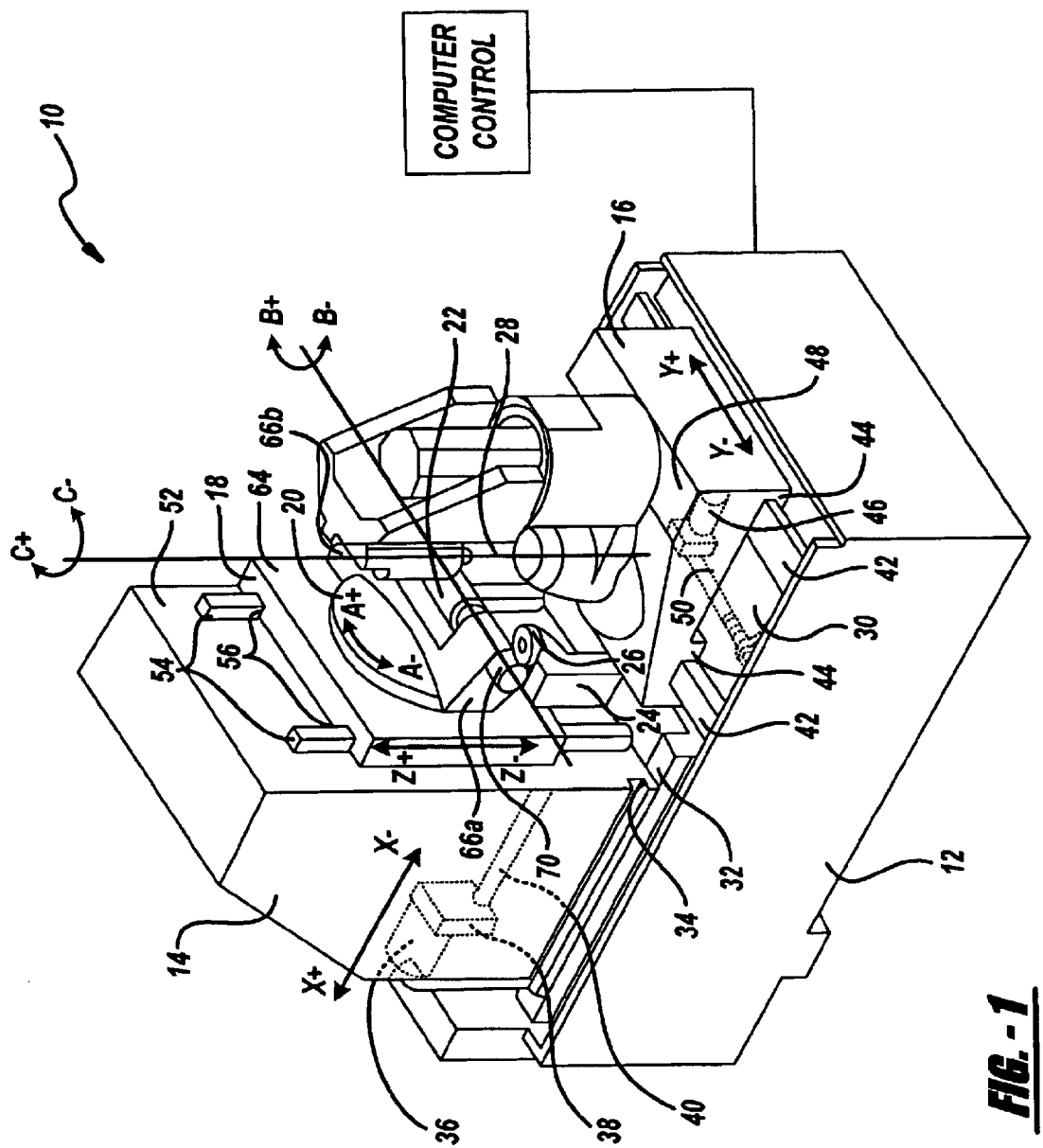
FIG. 1 is a perspective view of a gear manufacturing apparatus according to the principles of the present invention.

With particular reference to FIG. 1, an exemplary embodiment of a four-process manufacturing apparatus 10 (the apparatus) is shown. The apparatus 10 of the exemplary embodiment is provided for the manufacture of gears. However, it should be noted that the apparatus 10 is preferably variable for manufacture of any one of a number of alternative components. The apparatus 10 and its related components, described in detail below, are preferably CNC, controlled by any one of a number of controllers (not shown) commonly known in the art. The controller is programmable for manufacturing a variety of components and/or component designs. It is foreseen that the controller is also programmable to simultaneously control operation of the rectilinear movement of the various stocks described herein.

The apparatus 10 includes a generally rectangular, solid metal base 12 providing a solid support structure for the various apparatus components described herein. First and second stocks 14, 16 are included and are each slidably engaged with the base 12. A third stock 18 slidably engages the first stock 14. A fourth stock 20 is rotatably supported by the third stock 18 and operatively supports a combination hob/shave tool 22. A fifth stock 24 is positioned between the first and second stocks 14, 16 and operatively supports a combination chamfer/debur tool 26. The second stock 16 includes a retention device 28 for operably retaining a work-piece (not shown) during manufacture. Rectilinear movement of the various sliding stocks described above is achieved by respective drive motors that act through speed reducing gearing and recirculating ball screw drives.

The base 12 includes a top surface 30, to which the first and second stocks 14, 16 are slidably interfaced. The first stock 14 is slidable along a first axis X that runs along the length of the base 12. The second stock 16 is slidable along a second axis Y that is generally perpendicular to the first axis X, running across the width of the base 12. The base 12 includes a first pair of rails 32 disposed along a length of and extending upward from the top surface 30. The first pair of rails 32 slidably engages a corresponding pair of rails 34 disposed on a bottom surface of the first stock 14. Rectilinear movement of the first stock 14 is imparted by a drive motor 36 acting through a gear reduction unit 38 and a ball screw 40. The drive motor 36 is controllable for selectively sliding and locating the first stock 14 along the axis X. The base 12 further includes a second pair of rails 42 disposed across a width of and extending upward from the top surface 30. The second pair of rails 42 slidably engages a corresponding pair of rails 44 disposed on a bottom surface of the second stock 16. Rectilinear movement of the second stock 16 is imparted by a drive motor 46 acting through a gear reduction unit 48 and a ball screw 50. The drive motor 46 is controllable for selectively sliding and locating the second stock 16 along the axis Y.

The first stock 14 includes a front face 52 to which the third stock 18 is slidably attached. The front face 52 of the first stock 14 includes a pair of rails 54 extending therefrom that slidably engage a corresponding pair of rails 56 disposed on a back face of the third stock 18. The third stock 18 is slidable along a vertical axis Z of the front face 52. A drive motor (not shown) acting through a gear reduction unit (not shown) and ball screw (not shown) are provided for selectively sliding and locating the third stock 18 along the axis Z, relative to the second stock 16.

The third stock 18 further includes a front face 64, to which the fourth stock 20 is rotatably attached. The fourth stock 20 is selectively rotatable about a rotational axis A and includes first and second arms 66a, 66b extending therefrom, for operably retaining the combination hob/shave tool 22 therebetween. A positioning motor (not shown) is provided for rotationally positioning the fourth stock 20 about the rotational axis A. The hob/shave tool 22 is rotatably driven, by a drive motor 70, about an axis B that is generally parallel to the front face 64 of the third stock 18 and is initially generally perpendicular to the axis A. The rotational position of the fourth stock 20 and the lateral position of the third stock 18 are controlled by the controller.

Figure 2:
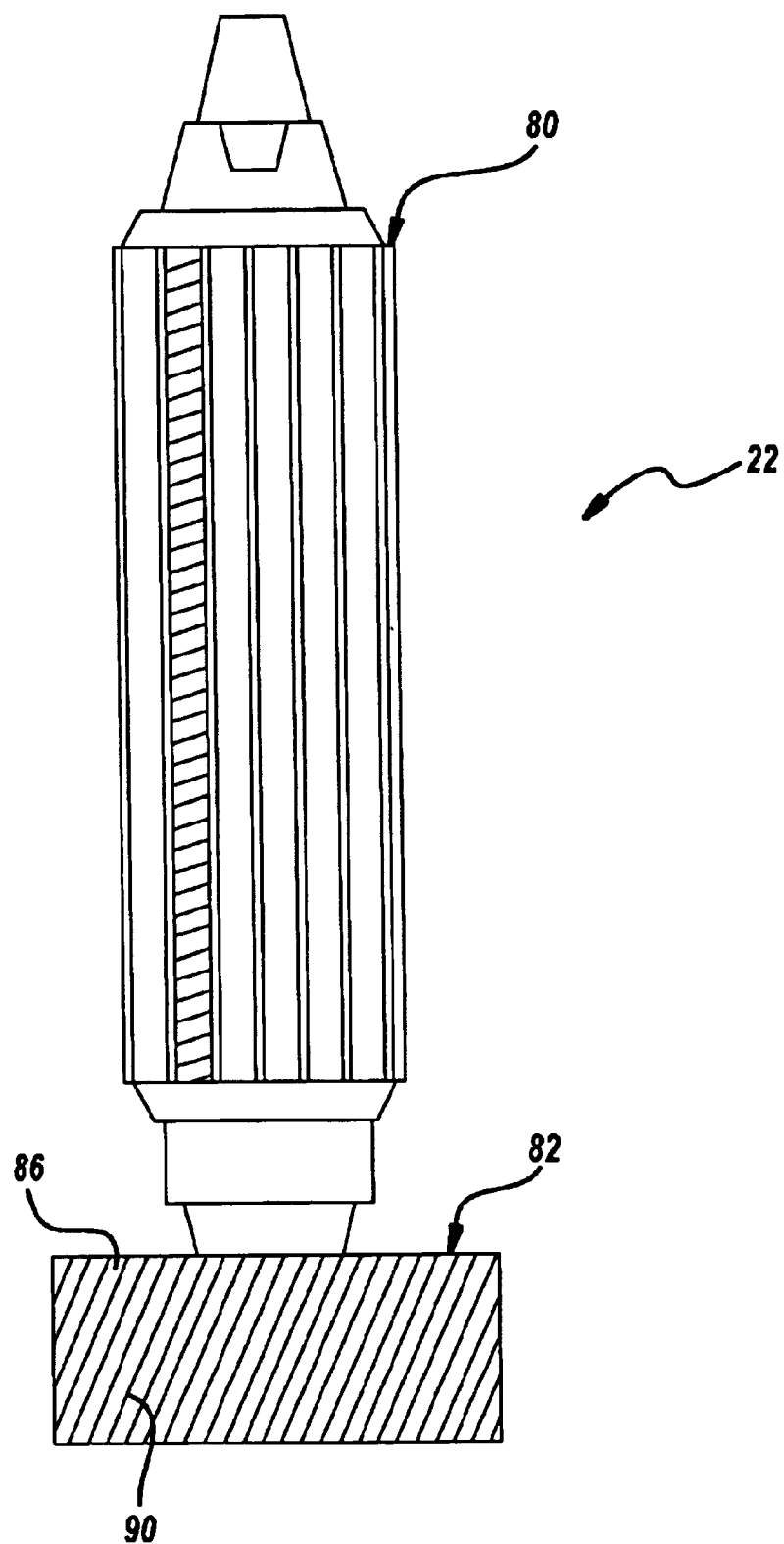
FIG. 2 is a plan view of a combination hob/shave tool of the gear manufacturing apparatus of FIG. 1.

With reference to FIG. 2, the hob/shave tool 22 includes a hob 80 and a shaver 82 affixed to one another. It should be noted, however that detachment of the hob 80 and shaver 82 is anticipated, whereby a portion of the hob/shave tool 22 may be replaced if worn before the other portion. The hob 80 is generally cylindrical in shape and includes a plurality of hob teeth 84 radially extending from a circumferential surface. The hob teeth 84 follow a generally helical path along the length of the hob 80. The shaver 82 is generally gear shaped including a plurality of gear teeth 86 and a clearance hole (not shown) through the base of each tooth 86. The gear teeth 86 are serrated to provide a series of cutting edges 90. The serrations extend from the tip of the tooth 86 into the clearance hole. The clearance holes provide channels for the flow of cutting fluid and material as the shaver operates.

With reference to FIG. 3, the chamfer/debur tool 26 is operatively supported by the fifth stock 24 and is rotatably driven by a drive motor (not shown) through a gear unit (not shown). With reference to FIG. 3, the chamfer/debur tool 26 is a generally gear shaped tool having a series of gear teeth 96 extending radially from an outside circumferential surface. At the ends of each of the gear teeth 96 is located a chamfer surface 98 that serves to displace material at the ends of gear teeth formed on the work-piece thereby producing a chamfer. Positioned adjacent each chamfer surface 98 is a cutting edge 100 that cuts away the displaced material for deburring the chamfer of the gear teeth.

As mentioned previously, the second stock 16 includes the retention device 28 for selectively holding a work-piece. It is foreseen that the work-piece may be either manually loaded, by an operator, or alternatively, an automated loading system (not shown) may be included for loading the work-piece into the apparatus 10. The work-piece is held by the retention device 28 such that it is freely rotatable about a rotational axis C. The rotational axis C is generally parallel to the front face 64 of the third stock 18 and perpendicular to the top surface 30 of the base 12. Rotation of the work-piece about the axis C is driven by the tools as described in further detail herein. It is also foreseen that the second stock is rotatable about an axis D. The rotational position of the second stock 16 is controlled by a positioning motor (not shown).

With reference to the Figures, a method of manufacturing a gear and the corresponding operation of the apparatus 10 will be described in detail. Manufacturing of a gear includes the steps of: loading a gear blank (work-piece), hobbing rough gear teeth into the work-piece chamfering and deburring the rough gear-teeth, finishing the gear teeth via shaving, and unloading the finished work-piece.

Initially, a work-piece, in the form of a cylindrical gear blank, is loaded into the retention device 28 of the second stock 16. Once locked in position, the controller initiates the hobbing step, whereby the hob/shave tool 22 is rotatably driven and fed into contact with the work-piece for forming rough gear teeth in the work-piece. The preferred feeding method of the present invention is infeed or plunge. The hob/shave tool 22 is infed via forward movement of the first stock 14 along the axis X, relative to the second stock 16. As the hob/shave tool 22 contacts a circumferential surface of the work-piece, the hob teeth 84 begin cutting corresponding teeth into the circumferential surface. As the hob teeth 84 cut, the helical pattern of the gear teeth cause the work-piece to rotate about the axis C. In this manner, the gear teeth are cut into the complete circumferential surface of the work-piece. The number of revolutions of the hob/shave tool 22, and thus the work-piece, is dependent upon the number of threads of the hob/shave tool 22. Upon completion of rough gear tooth formation, the hob/shave tool 22 is withdrawn through reverse movement of the first stock 14 along the axis X, relative to the second stock 16.

After the hob/shave tool 22 has been withdrawn, the chamfer/debur tool 22 is brought into meshed engagement with the work-piece. Specifically, the gear teeth of the chamfer/debur tool 26 engage the rough gear teeth of the work-piece. Initially, the chamfer/debur tool 26 is rotatably driven in a first direction whereby the chamfer surfaces 98 displace material at both ends of the rough gear teeth and the displaced material is cut away by the corresponding cutting edge 100. As the chamfer/debur tool 26 rotates, the meshed engagement with the work-piece causes corresponding rotation of the work-piece. The rotation of the chamfer/debur tool 26 then ceases and changes direction, rotating in a second direction. In this manner, chamfers are formed at the ends of each of the rough gear teeth about the circumference of the work-piece and excess material is cut away on both sides of each gear tooth. Upon completion of the chamfer/debur process, the chamfer/debur tool 26 is withdrawn from the work-piece.

During operation of the chamfer/debur tool 26 on the work-piece, the fourth stock 20 is concurrently repositioned on the third stock 18 to prepare the hob/shave tool 22 for a subsequent shaving process. The fourth stock 20 rotates approximately 90° on the front face 64 of the third stock 18, whereby the rotational axis B is positioned generally parallel to the rotational axis C and generally perpendicular to the top surface 30 of the base 12. In this manner, the shaver 82 is properly aligned for engagement with the work-piece. Concurrent repositioning of the fourth stock 20 helps to reduce overall cycle time of the manufacturing process.

Once the chamfer/debur tool 26 is completely withdrawn, the first stock 14 again moves forward along the axis X and the third stock 18 is concurrently adjusted on the Z axis whereby the shaver 82 of the hob/shave tool 22 is aligned for meshed engagement with the work-piece. The serrated teeth 86 of the shaver 82 engage the rough gear teeth of the work-piece. The hob/shave tool 22 is initially driven in a first rotational direction by the fourth stock 20, whereby the work-piece is correspondingly caused to rotate, due to the meshed engagement therebetween. Similar to the chamfer/debur tool 26, the shaver 82 stops and rotates in a second direction opposite that of the first. This "reversal" process is repeated twice more for a total of six times, three in each direction. As the shaver 82 and work-piece rotate together, each of the serrated gear teeth 86 of the shaver 82 act upon the rough gear teeth of the work-piece for finishing both sides of each gear tooth of the work-piece. Upon completion of the shaving process, the hob/shave tool 22 is withdrawn and the finished gear is unloaded from the retention device 28.

As initially noted, the apparatus of the present invention includes four manufacturing processes. By performing four-processes, only a single machine need be purchased to produce a finished gear. Thus, significant savings are realized in initial capital investment costs. Additionally, a single machine occupies less floor space, requires less maintenance attention and less running costs, than multiple machines. Therefore, additional savings are achieved throughout the lifetime of the machine. Further, overall cycle-time is significantly reduced because a component is only loaded and unloaded once and there is no transfer time present between machines. The reduced cycle-time translates into further cost savings.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A gear production apparatus for producing a gear from a blank, comprising:
   a base;
   a first stock slidable along a longitudinal axis of said base and including a tool retainer rotatably supported thereon;

a second stock slidable along a lateral axis of said base and including a component holder supported thereon for holding the blank, and a combination hob and shave tool drivably supported within said tool retainer, wherein in a first operation said hob and shave tool rotates about a first axis for hobbing a gear form into the blank and in a second operation said hob and shave tool rotates about a second axis generally perpendicular to said first axis for shaving said gear form of the blank.

2. The gear production apparatus of claim 1, further comprising a combination chamfer and debur tool operably supported on said base and selectively engageable with the blank for chamfering and deburring the blank between said first and second operations.

3. The gear production apparatus of claim 1, further comprising a third stock slidably supported on said first stock, said third stock supporting said combination hob and shave tool for positioning thereof along said second axis.

4. The gear production apparatus of claim 3, further comprising a fourth stock rotatably supported on said third stock, said fourth stock supporting said tool retainer and being rotatable for selectively aligning said combination hob and shave tool along one of said first and second axis.

5. The gear production apparatus of claim 1, further comprising a ball/screw drive unit for positioning said first stock along said transverse axis.

6. The gear production apparatus of claim 1, further comprising a ball/screw drive unit for positioning said second stock along said lateral axis.

7. The gear production apparatus of claim 1, further comprising a programmable computer for controlling operation of the gear production apparatus.

8. A method of producing a gear from a blank, comprising the steps of:

providing a rotatably supported combination hob and shave tool;

providing a retainer for retaining the blank;

driving said combination hob and shave tool into the blank in a first hobbing operation, whereby said combination hob and shave tool rotates about a first axis; and engaging said combination hob and shave tool with the blank in a second hobbing operation, whereby said combination hob and shave tool rotates about a second axis generally perpendicular to said first axis.

9. The method of claim 8, further comprising the steps of rotating said combination hob and shave tool from said first axis to said second axis between said driving and said engaging.

10. The method of claim 8, further comprising the steps of:

providing a combination chamfer and debur tool; and engaging said combination chamfer and debur tool with the blank in a third operation.

11. The method of claim 10, wherein said third operation occurs subsequent to said first operation and prior to said second operation.

12. The method of claim 8, further comprising the step of providing a programmable computer for controlling said first and second operations.

* * * * *